(12) United States Patent
Rudnick, III et al.

(10) Patent No.: US 9,547,303 B2
(45) Date of Patent: Jan. 17, 2017

(54) MANAGING THE MANUFACTURING LIFECYCLE OF FASTENERS OF A PRODUCT

(71) Applicant: The Boeing Company, Seal Beach, CA (US)

(72) Inventors: Fredrick C. Rudnick, III, Shoreline, WA (US); Christopher L. Carpenter, Bothell, WA (US); Anthony J. Williams, Mill Creek, WA (US)

(73) Assignee: The Boeing Company, Chicago, IL (US)

(*) Notice: Subject to any disclaimer, the term of this patent is extended or adjusted under 35 U.S.C. 154(b) by 574 days.

(21) Appl. No.: 14/056,983

(22) Filed: Oct. 18, 2013

(65) Prior Publication Data

US 2015/0112468 A1    Apr. 23, 2015

(51) Int. Cl.
*G05B 15/00* (2006.01)
*G06F 17/50* (2006.01)
*G05B 19/418* (2006.01)
*G05B 19/4097* (2006.01)

(52) U.S. Cl.
CPC ..... *G05B 19/41865* (2013.01); *G05B 19/4097* (2013.01); *G05B 2219/31472* (2013.01)

(58) Field of Classification Search
CPC .............. G05B 19/41865; G05B 19/4097; G05B 2219/31472
USPC ................................. 700/83; 703/1
See application file for complete search history.

(56) References Cited

U.S. PATENT DOCUMENTS

| 6,185,476 B1* | 2/2001 | Sakai ................. G05B 19/4097 700/145 |
| 6,219,049 B1* | 4/2001 | Zuffante ................. G06F 17/50 345/420 |
| 6,922,599 B2* | 7/2005 | Richey ............... G05B 19/4097 700/97 |
| 7,552,203 B2 | 6/2009 | Giles et al. |
| 8,400,446 B2 | 3/2013 | Gatzke et al. |

(Continued)

OTHER PUBLICATIONS

O'Connor-J., "Airframe Design Technology", Vistagy Inc., Dec. 2006, pp. 35 and 36.*

(Continued)

*Primary Examiner* — Robert Fennema
*Assistant Examiner* — Thomas Stevens
(74) *Attorney, Agent, or Firm* — Womble Carlyle Sandridge & Rice LLP

(57) ABSTRACT

A system is provided that is configured to receive a manufacturing process plan for a product including a plurality of component parts joined by fasteners, with the manufacturing process plan including process definitions that describe process operations in which component parts are worked to manufacture of the product. The system is configured to generate graphical views for respective process operations of the manufacturing process plan in which fastener locations are worked for installation of respective fasteners to join component parts of the product, and output the graphical views. The graphical view of a process operation may graphically depict one or more component parts and only those of the fastener locations on the one or more component parts worked during the process operation, with any others of the fastener locations on the same or other component parts being hidden from the graphical view.

21 Claims, 7 Drawing Sheets

(56) References Cited

U.S. PATENT DOCUMENTS

Figure 1:
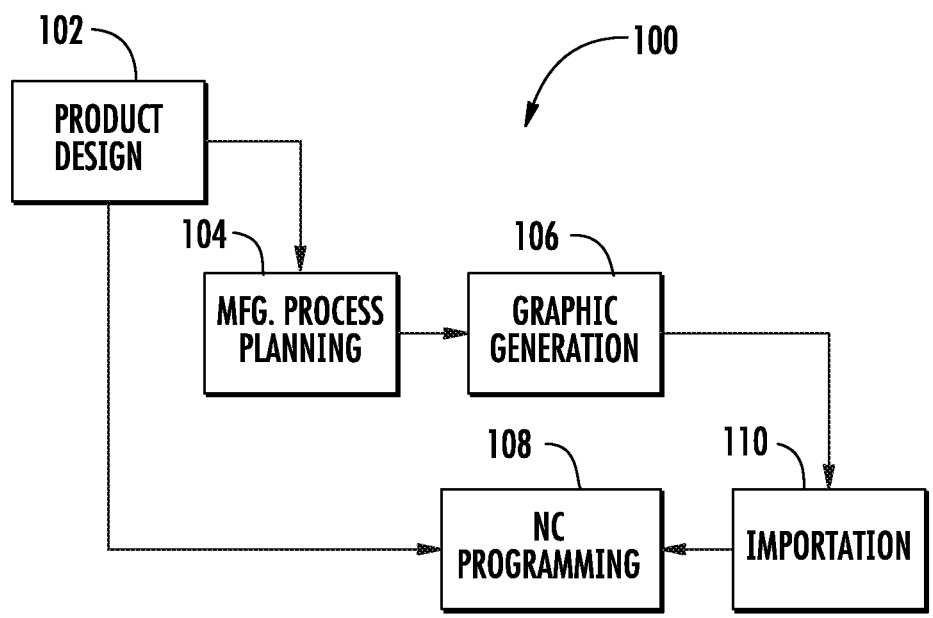

| | | |
|---|---|---|
| 2004/0049577 A1* | 3/2004 | Imhof ................ H04L 12/2602 709/224 |
| 2004/0181549 A1 | 9/2004 | Pate |
| 2005/0165831 A1* | 7/2005 | Solomon ........... G06F 17/30067 |
| 2006/0106483 A1 | 5/2006 | Behan et al. |
| 2007/0011496 A1* | 1/2007 | Ahmad .................. G06F 17/50 714/39 |
| 2007/0106410 A1 | 5/2007 | Bouffiou et al. |
| 2008/0301012 A1 | 12/2008 | Cogswell et al. |
| 2009/0030661 A1 | 1/2009 | Bouffiou et al. |
| 2009/0216804 A1 | 8/2009 | Kersavage et al. |
| 2010/0145490 A1 | 6/2010 | Muser et al. |
| 2010/0161095 A1* | 6/2010 | Lindgren ............ G06F 17/5095 700/98 |
| 2011/0022208 A1 | 1/2011 | Bouffiou et al. |
| 2011/0077914 A1* | 3/2011 | Kunkee .................. G06T 19/00 703/1 |

OTHER PUBLICATIONS

D'Agostino, "Cenit's software manages fasteners across the aircraft's life cycle," Copyright 2009, AEM, Dec. 17, 2009, 2 pages.
D'Agostino et al., The fast track to fastener management, 2011, Aerospace Manufacturing, Feb. 2011, pp. 30-31.
Solutions Portfolio, Virtual Manufacturing for Real Savings, Copyright 2002, DELMIA Solutions, Dassault Systemes, 11 pages.
"SYNCROFIT, Propelling world-class development of airframe assemblies," Copyright 2012, Siemens Product Lifecycle Management Software Inc., 16 pages.
Canadian Examination Report dated Sep. 29, 2015 for Application No. 2,856,503, 5 pages.
European Search Report for Application No. 14180098.8 dated Mar. 3, 2015, 5 pages.

* cited by examiner ly requires
the successful integration of hundreds of thousands of parts
and associated processes according to a comprehensive plan
to produce an aircraft in accordance with engineering design
data, and includes the automated manufacturing of a number
of components, assemblies and sub-assemblies according to
NC programming techniques.

MANAGING THE MANUFACTURING LIFECYCLE OF FASTENERS OF A PRODUCT

TECHNOLOGICAL FIELD

The present disclosure relates generally to managing the manufacturing lifecycle of a product and, in particular, to managing the manufacturing lifecycle of fasteners of a product.

BACKGROUND

Complex manufacturing projects such as the design and manufacture of aircraft generally require the successful integration of design engineering, manufacturing engineering and sometimes numerical control (NC) programming. The production of aircraft, for example, typically requires the successful integration of hundreds of thousands of parts and associated processes according to a comprehensive plan to produce an aircraft in accordance with engineering design data, and includes the automated manufacturing of a number of components, assemblies and sub-assemblies according to NC programming techniques.

From design engineering, engineering design data typically includes engineering drawings and parts lists that cooperatively form an engineering product plan that describes how component parts including materials, components, assemblies and sub-assemblies must be combined to form the desired product. For this, design engineering often makes use of computer-aided design (CAD) systems.

Manufacturing engineering may include the subsequent compilation of a manufacturing process plan from the engineering design data to make sure the intent of the design engineering is properly executed, often making use of manufacturing process planning (MPP) systems. Manufacturing engineering produces this manufacturing process plan so that identified parts in the desired product may be properly scheduled for assembly on the factory floor. Suitable scheduling and coordination is particularly important in complex projects that require accurate estimation of factors such as the overall cost of the project, the time required for completion of the project, and the risk of failure. In addition, these complex projects often require accurate estimation of other variables of importance such as the overall efficiency of the project. The manufacturing process plan therefore typically includes factory floor planning, tool planning and scheduling, compilation of work plans for assembly personnel, assembly plans, and other similar activities.

The NC programming for automated manufacture of various parts of the product generally takes input of engineering design data from design engineering, and the manufacturing process plan from manufacturing engineering. The NC programming produces machine control data such as commands for operation of automated machinery to produce the respective components, assemblies and sub-assemblies of the product, often making use of computer-aided manufacturing (CAM) systems.

Although existing process planning and analysis techniques are useful, it is generally desirable to improve upon existing techniques.

BRIEF SUMMARY

Example implementations of the present disclosure provide a system and method of managing the manufacturing lifecycle of fasteners installed to join component parts during manufacture of a product. Example implementations may be useful for defining and maintaining the manufacturing process lifecycle of fasteners to support process planning and numerical control (NC) programming for manufacture of the product. For this purpose, various example implementations may provide a graphic generation system configured to generate one or more graphical views that merge fastener locations defined by engineering design data, into one or more process operations of a manufacturing process plan for the product. These graphical views may provide a number of benefits such as improved implementation of NC data management methods, and may enable the communication of the process intent in three-dimensions (3D).

Example implementations provide graphical view(s) of the manufacturing lifecycle of fasteners installed to join parts assembled together, which may thereby provide users with graphical, discrete-level information for the fasteners that may not otherwise be available. The graphical view(s) may be used to define fastener locations and manufacturing process operations performed at the respective locations to install fasteners at the respective locations. Design engineering may define the fastener locations, but manufacturing engineering may be responsible to make sure the design intent is properly executed through the process operations performed at the respective locations.

In some examples, integration with a manufacturing process planning system may be provided to allow process planning of automated and manually-installed fasteners. An NC programming system may be employed to quickly and easily enable programming of automated machinery such as drill, drill and fasten or weld systems used during the manufacturing lifecycle of the fasteners. This may reduce the time required to create machine control data for the programming of automated machinery.

According to one aspect of example implementations, a system is provided that includes an input module, view generator and output module. The input module may be configured to receive a manufacturing process plan for a product including a plurality of component parts joined by fasteners, with the manufacturing process plan including process definitions that describe process operations in which component parts are worked to manufacture of the product. The view generator may be configured to generate graphical views for respective process operations of the manufacturing process plan in which fastener locations are worked for installation of respective fasteners to join component parts of the product, and the output module may be configured to output the graphical views. The graphical view of a process operation may graphically depict one or more component parts and only those of the fastener locations on the component part(s) worked during the process operation, with any others of the fastener locations on the same or other component parts being hidden from the graphical view.

In some examples, the manufacturing process plan may further identify locations on a factory floor where the process operations are to be performed. In these examples, the graphical view of a process operation generated by the view generator may further include the process definition of the process operation and identifies the location on the factory floor where the process operation is to be performed.

In some examples, the graphical view of a process operation generated by the view generator may graphically depict the component part(s) as a collection of primitives arranged to reflect a three-dimensional geometry of the component part(s). In these examples, the graphical view may graphically depict respective fastener locations as at least one of points or vectors without reflecting the three-dimensional geometry of fasteners installed at the respective fastener locations.

In some examples, the input module, view generator and output module may be elements of a graphic-generation system. In these examples, the system may further include an importation system coupled to the graphic-generation system. The importation system may be configured to import process operation-related data from the graphical views into a numerical control (NC) programming system. The process operation-related data may include at least process definitions and fastener locations for the respective process operations of the manufacturing process plan in which the fastener locations are worked.

In some examples, the system may further include the NC programming system, which in these examples may include an input module, in-process model generator, data merge module and output module. The input module may be configured to receive engineering design data including engineering requirements for the product including the component parts, where the engineering requirements may include fastener data for fasteners installed to join the component parts. The in-process model generator may be configured to generate an NC in-process model for one or more component parts, where the NC in-process model may include fastener data for fasteners with fastener locations on the respective one or more component parts. The data merge module may be configured to receive process operation-related data from the importation system, and add the process operation-related data to the NC in-process model. Here, the process operation-related data may be merged with the fastener data of the NC in-process model. And the output module may be configured to output the NC in-process model.

In some further examples, the NC in-process model is a second NC in-process model. In these further examples, the in-process model generator being configured to generate the NC in-process model may include being configured to generate an NC in-process model assembly including a first NC in-process model and the second NC in-process model. Here, the first NC in-process model may include engineering requirements for the respective one or more component parts.

In some examples, the importation system may include an input module, parser, organization module and output module. The input module may be configured to receive the graphical views. The parser may be configured to loop through the graphical views and parse each graphical view into its portion of the process operation-related data. The organization module may be configured to reorganize the process operation-related data for the graphical views by fastener location, with each fastener location thereby being associated with one or more process definitions. And the output module may be configured to output the reorganized process operation-related data to the NC programming system.

In some examples, the importation system may be further configured to generate a log file that textually describes the process operation-related data. In these examples, the log file may be comparable to engineering design data including engineering requirements for the product including the component parts. Here, the log file may be comparable to the engineering design data to verify accuracy of fastener locations graphically depicted by the graphical views and imported as process operation-related data.

In other aspects of example implementations, a method and computer-readable storage medium are provided. The features, functions and advantages discussed herein may be achieved independently in various example implementations or may be combined in yet other example implementations further details of which may be seen with reference to the following description and drawings.

BRIEF DESCRIPTION OF THE DRAWING(S)

Figure 2:
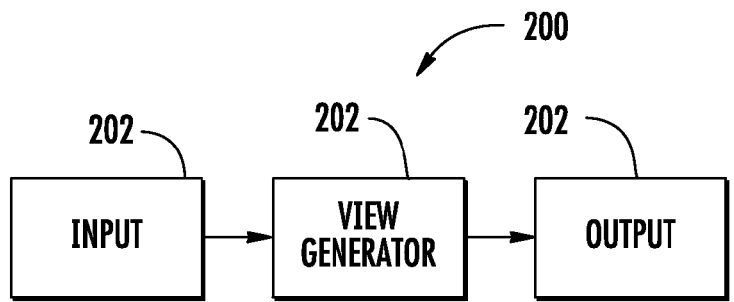
Figure 3:
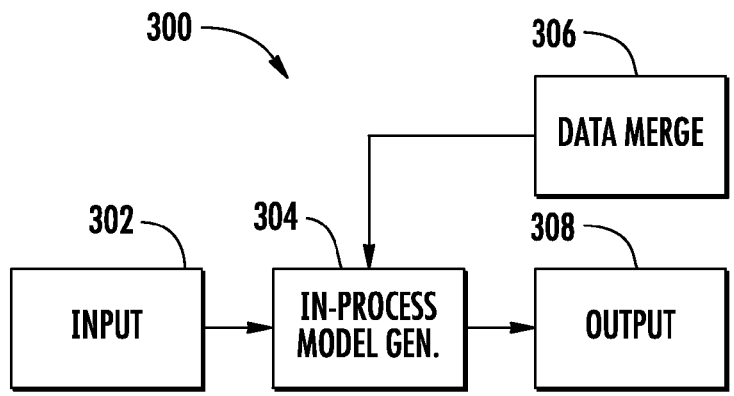
Figure 4:
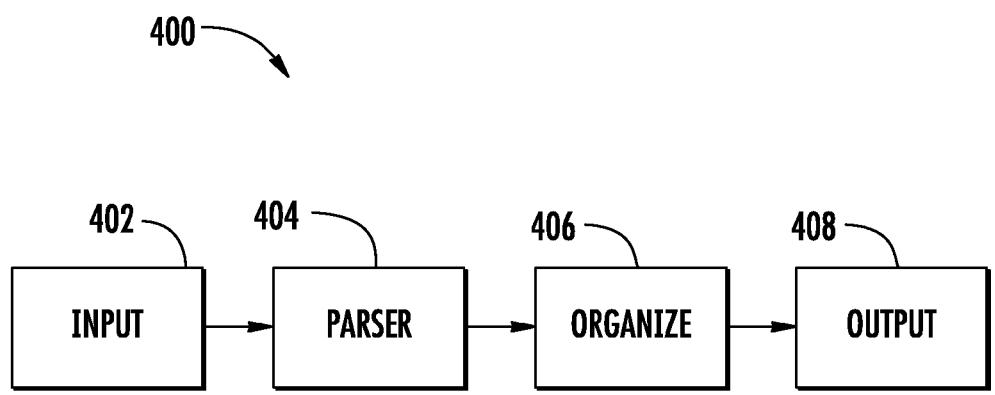

Having thus described example implementations of the disclosure in general terms, reference will now be made to the accompanying drawings, which are not necessarily drawn to scale, and wherein:

FIG. 1 is an illustration of a fastener manufacturing-lifecycle-management system in accordance with an example implementation;

FIGS. 2, 3 and 4 illustrate a suitable graphic-generation system, NC programming system and importation system, respectively, according to example implementations of the present disclosure; and FIGS. 5, 6, 7, 8A and 8B depict example graphical views and NC in-process models that may output for display by a graphic-generation system and NC programming system, according to example implementations of the present disclosure.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Also, something may be shown or described as being above something else (unless otherwise indicated) may instead be below, and vice versa; and similarly, something shown or described as being to the left of something else may instead be to the right, and vice versa. Like reference numerals refer to like elements throughout.

Example implementations of the present disclosure relate generally to managing the manufacturing lifecycle of fasteners of a product composed of a plurality of component parts. Example implementations will be primarily described in conjunction with aerospace applications in which the product may be an aircraft composed of component parts such as materials, components, assemblies and sub-assemblies. It should be understood, however, that example implementations may be utilized in conjunction with a variety of other applications, both in the aerospace industry and outside of the aerospace industry.

In various examples, the product may include a plurality of fasteners that join component parts assembled together. Examples of suitable types of fastener include externally-threaded bolts or screws, rivets, pins, spot welds, tack welds or the like. In some examples, fastener collars may also be considered a type of fastener, such as in the case of an internally-threaded nut that screws onto an externally-threaded bolt or screw.

The manufacturing lifecycle of a fastener that joins component parts includes one or more process operations in which a fastener location on one or more of the component parts is worked for installation of the fastener at the respective fastener. These process operations may depend on the type of fastener. For example, the process operations may include drilling a hole into or through component part(s) at the fastener location, installing a fastener (e.g., externally-threaded screw or bolt, rivet, pin) into the hole, and perhaps also applying a fastener collar (e.g., internally-threaded nut) to the fastener. In another example, the process operations may simply include installing a fastener (e.g., spot weld, tack weld) at the fastener location.

FIG. 1 illustrates a fastener manufacturing-lifecycle-management system 100 is illustrated according to example implementations of the present disclosure. The system may include any of a number of different subsystems (each an individual system) for performing one or more functions or operations. As shown, for example, the system may include one or more of each of a product design system 102, manufacturing process planning system 104, a graphic-generation system 106, NC programming system 108 and/or importation system 110. Although shown as part of the fastener manufacturing-lifecycle-management system, one or more of the product design system, manufacturing process planning system, graphic-generation system, NC programming system and/or importation system may instead be separate from but in communication with the fastener manufacturing-lifecycle-management system. It should also be understood that one or more of the subsystems may function or operate as a separate system without regard to others of the subsystems. And further, it should be understood that the fastener manufacturing-lifecycle-management system may include one or more additional or alternative subsystems than those shown in FIG. 1.

The product design system 102 may be employed during design engineering of a product such as an aircraft, and may be generally configured to receive, produce or otherwise provide engineering design data that generally describes configuration of the product including its component parts. The engineering design data may include, for example, a digital three-dimensional (3D) model (sometimes referred to as solid model) of the product. As another example, the engineering design data may include a collection of engineering requirements for the product that may collectively form an engineering requirements model (ERM), and which in some examples may be represented by one or more two-dimensional (2D) drawings. For this design engineering, in some examples, the product design system may include or otherwise benefit from a commercially-available computer-aided design (CAD) system, such as the CATIA digital modeling system, available from Dassault Systèmes S.A. of Vélizy-Villacoublay, France.

The 3D model may represent the geometry of the product including at least some of its component parts. For example, the 3D model may represent the product as a collection of computer-graphics primitives (image elements) such as edges, faces, points (e.g., vertices) and the like, which may be arranged into polygons or other arithmetically-derived structures to reflect the 3D geometry of the respective product including its surfaces, volumes or parts. The product may be defined by a "boundary" representation, or collection of polygons that demarcate the space occupied by the product, which may include sub-collections of polygons that demarcate spaces occupied by respective parts of the product. For some products, the 3D model may use hundreds of thousands of polygons.

The ERM may include, for example, product manufacturing information (PMI) such as geometric dimensions and tolerances (GD&T), material specifications, component lists, process specifications, inspection requirements or the like. This data may convey the design engineering intent for how the product should be fabricated, assembled, operated, maintained or the like. In some examples, the ERM may represent the engineering authority for the product.

In various examples, the product may include a plurality of fasteners that join component parts assembled together. For a number of larger complex products such as aircraft that include thousands if not millions of fasteners that join its component parts, however, the 3D model may not model or otherwise represent the 3D geometry of individual fasteners. The ERM may represent fastener locations by points, vectors (e.g., centerlines), and perhaps other parametric data, such as the type or types of fasteners and any installation specification requirements. In some examples, this fastener data may be provided by joint definitions that specify the type and manner of joining component parts assembled together during manufacture of the product.

The manufacturing process planning system 104 may be employed during manufacturing engineering of the product, and may be generally configured to receive engineering design data for the product, and produce or otherwise provide a manufacturing process plan for the product including its component parts. The manufacturing process plan may include process definitions that describe process operations in which component parts are worked to manufacture of the product; and in some examples, the manufacturing process plan may identify locations on the factory floor where the process operations are to be performed. These component parts may be as defined by the engineering design data, and in some examples, the manufacturing process plan may include one or more links to the engineering design data. For this manufacturing engineering, in some examples, the manufacturing process planning system may include or otherwise benefit from a commercially-available manufacturing process planning (MPP) system or suite, such as DELMIA DPM, DPE or the like, also available from Dassault Systèmes S.A. And at this point, in some examples, the manufacturing process plan may be pure text and links.

The manufacturing process plan may include a number of process operations in which fastener locations on component parts are worked for installation of respective fasteners, and these process operations may compose their manufacturing lifecycle. As part of the manufacturing engineering of the product, it may be desirable to visualize the manufacturing lifecycle of one or more fasteners. The graphic-generation system 106 of example implementations may therefore be generally configured to generate graphical views for at least some of the process operations of the manufacturing process plan, including one or more in which fastener location(s) on component part(s) are worked for installation of respective fastener(s). For this purpose, in some examples, the graphic-generation system may include or otherwise benefit from a commercially-available tool such as 3DVIA available from Dassault Systèmes S.A.

The NC programming system 108 of example implementations may be generally configured to perform numerical control programming of automated machinery to perform various process operations including the installation of at least some of the fasteners. The NC programming system may be configured to generate an NC in-process model of one or more component parts, which model may include fastener data (from the ERM) for fasteners with fastener locations on the respective component part(s). In some examples, the NC programming system may include or otherwise benefit from a commercially-available tool such as CATIA.

The importation system 110 may be generally configured to import process operation-related data from the graphical views of process operations, which the NC programming system 108 may add to the NC in-process model and merge with the fastener data. The resulting NC in-process model may include data logically ordered to facilitate its use and understanding by a user such as an NC programmer who may interact with the NC programming system to define machine motion and order of process operations including one or more in which fastener locations on the component part(s) are worked for installation of respective fasteners. The NC programming system may generate a file of machine control data for programming of automated machinery to perform the respective process operations.

FIG. 2 illustrates various elements of a suitable graphic-generation system 200, which in some example implementations of the present disclosure may correspond to the graphic-generation system 106 of FIG. 1. As indicated above and explained in greater detail below, the graphic-generation system may be generally configured to generate graphical views for respective ones of at least some process operations of a manufacturing process plan for a product. And as shown, the graphic-generation system may include an input module 202, view generator 204 and output module 206.

The input module 202 may be configured to receive a manufacturing process plan for a product including component parts. One example of a suitable manufacturing process plan may be that produced or otherwise provided by a manufacturing process planning system (e.g., manufacturing process planning system 104). As explained above, the manufacturing process plan may include process definitions that describe process operations in which component parts are worked, and may also identify locations on the factory floor where the process operations are to be performed. The process plan may include links to engineering design data (e.g., 3D model, ERM) that describes configuration of the product including its component parts, and through these links the input module may receive various engineering design data.

The view generator 204 may be configured to generate graphical views for respective ones of at least some process operations of the manufacturing process plan, including one or more in which fastener location(s) on component part(s) are worked for installation of respective fastener(s). As explained above, in one example, these process operation(s) may include drilling a hole into or through component part(s) at the fastener location, installing a fastener (e.g., externally-threaded screw or bolt, rivet, pin) into the hole, and perhaps also applying a fastener collar (e.g., internally-threaded nut) to the fastener. In another example, these process operation(s) may simply include installing a fastener (e.g., spot weld, tack weld) at the fastener location.

In some examples, the graphical view may be lightweight in that it may include a graphical depiction (e.g., 3D graphical depiction) that does not include the overhead of the mathematical definition required to define a surface or solid model, such as in the context of a 3D model. In effect, in at least some of these examples, the graphical depiction may be considered a 3D shell result.

The graphical view of a process operation generated by the view generator 204 may graphically depict one or more component parts and one or more fastener locations on the component part(s) worked during the process operation. The graphical view may also include the process definition of the process operation and identify the location on the factory floor where the process operation is to be performed, either or both of which may be at least partially identified by appropriate code(s).

The graphical view may graphically depict the component part(s) and fastener locations for a process operation in any of a number of different manners. In one example, the graphical view may graphically depict the component part(s) as a collection of primitives similar to the 3D model. That is, the graphical view may graphically depict the component part(s) as a collection of primitives arranged to reflect the 3D geometry of the respective component part(s). The graphical view may depict the fastener locations as points and/or vectors (e.g., centerlines) such as those from the ERM, without reflecting the 3D geometry of fasteners installed at the respective fastener locations. In some examples, the graphical view may graphically depict only those of the fastener locations worked during the process operation, with any others of the fastener locations on the same or other component part(s) (those worked during other process operations instead) being hidden. The graphic-generation system may therefore represent fasteners by process operation and fastener location, which may convey manufacturing-engineering intent for how and where fasteners should be installed.

The output module 206 may be configured to receive and output the graphical views such as to a display, printer or the like. In some examples, the output module may receive and output complete graphical views after the view generator has generated the views including all of their constituent data and content. In other examples, the output module may receive and output the graphical views after the view generator has generated the views depicting component part(s) and including respective process definitions and factory-floor locations, but before also depicting fastener location(s) on the depicted component part(s). In these examples, the view generator may then add the depicted fastener locations to the generated views, which the output module may then output in complete graphical views.

FIGS. 3 and 4 illustrate various elements of a suitable NC programming system 300 and importation system 400, respectively, which in some example implementations of the present disclosure may correspond to the NC programming system 108 and importation system 110 of FIG. 1. As indicated above and explained in greater detail below, the NC programming system may be generally configured to generate an NC in-process model of one or more component parts. The importation system, then, may be generally configured to import process operation-related data from the graphical views of process operations, which the NC programming system may add to the NC in-process model and merge with the fastener data.

As shown in FIG. 3, the NC programming system 300 may include an input module 302, in-process model generator 304, data merge module 306 and output module 308. The input module may be configured to receive engineering design data for a product including component parts, and which engineering design data describes configuration of the product including its component parts. In some examples, the engineering design data may be that received, produced or otherwise provided by a product design system (e.g., product design system 102). As explained above, the engineering design data may include a 3D model of the product including at least some of its component parts, and a collection of engineering requirements that may form an ERM.

The in-process model generator 304 may be configured to generate an NC in-process model of one or more component parts of the product. In some examples, the in-process model generator may generate an empty (shell), first NC in-process model of component part(s), and add to the first NC in-process model, engineering requirements for the respective component part(s) from the engineering design data. The in-process model generator may then generate another, empty second NC in-process model of the respective component part(s). The first and second NC in-process models may then be treated as an NC in-process model assembly, and further processing may be made with respect to the second NC in-process model to avoid inadvertent changes to engineering requires in the first NC in-process model.

The in-process model generator 304 may add to the second NC in-process model, fastener data (from the ERM) for fasteners with fastener locations on the respective component part(s). In some examples, links may be established between the second NC in-process model and ERM. Each fastener location may be linked so in instances in which the ERM is revised, the in-process model may be easily updated to reflect the revision. The NC programming system 300 may then be called to add process operation-related data to the second NC in-process model. In some examples, the NC programming system may invoke an importation system (e.g., importation system 110, 400) to import process operation-related data from graphical views of process operations generated by a graphic-generation system (e.g., graphic-generation system 106, 200). This process operation-related data may include, for example, process definitions, fastener locations, and perhaps also factory-floor locations, for process operations in which the fastener locations are worked for installation of respective fasteners—or in some examples, codes that identify the process definitions and factory-floor locations.

As shown in FIG. 4, the importation system 400 may include an input module 402, parser 404, organization module 406 and output module 408. The input module of the importation system may be configured to receive graphical views of process operations generated by a graphic-generation system (e.g., graphic-generation system 106, 200). As explained above, the graphical view of a process operation may include a respective process definition and factory-floor location, and may graphically depict fastener location(s) on component part(s) worked during the process operation. The parser may be configured to loop through the graphical views. The parser may parse each graphical view into its portion of process operation-related data, including the process definition, fastener locations, and perhaps also factory-floor location. The organization module may then reorganize the process operation-related data for the graphical views by fastener location, with each fastener location thereby being associated with one or more process definitions and factory-floor locations. The output module 408, then, may be configured to receive and output the reorganized process operation-related data, such as to an NC programming system (e.g., NC programming system 108, 300).

Returning to FIG. 3, the data merge module 306 may be configured to receive process operation-related data to be added to the second NC in-process model, such as from the importation system (e.g., importation system 110, 400)—or more particularly in one example the output module of importation system 400. The data merge module may be configured to add the process operation-related data to the second NC in-process model, with the process operation-related data being merged with the fastener data of the second NC in-process model. Again, the second NC in-process model may include fastener data (from the ERM) for fasteners with fastener locations on one or more component parts of the product. The fastener data may include fastener locations represented by points, vectors (e.g., centerlines), and include other parametric data, such as the type or types of fasteners and any installation specification requirements. The process operation-related data from the may include process definitions and factory-floor locations for process operations in which fastener locations on the respective component part(s) are worked for installation of respective fasteners. Or reorganized, the process operation-related data may include fastener locations and respective associated process operation(s) and factory-floor location(s).

The data merge module 306 may be configured to loop through the fastener data in the second NC in-process model, and compare each fastener location in the fastener data to fastener locations in the process operation-related data. For each fastener location in the fastener data that matches a fastener location in the process operation-related data, the data merge module may create a geometric set for the fastener location in the second NC in-process model. The data merge module may then add fastener data, process definition(s) and factory-floor location(s) for the fastener location to the geometric set, such as by adding appropriate parameters to the geometric set. For each fastener location, the fastener data, process definition(s) and factory-floor location(s) may thereby be merged within the second NC in-process model.

The output module 308 may be configured to receive and output the second NC in-process model, or in some examples, may receive and output the NC in-process model assembly including the first and second NC in-process models, such as to a display, printer or the like. In some examples, the fastener locations represented in the second NC in-process model may be coded based on the process operation-related data such as by size, color, shape or the like, which may be shown in the output from the output module. The resulting NC in-process model assembly may then be used to create NC programming media. That is, the NC in-process model assembly may include data logically ordered to facilitate its use and understanding by a user such as an NC programmer who may interact with the NC programming system 300 to define machine motion and order of process operations including one or more in which the component part(s) are worked for installation of at least some of the fasteners at respective fastener locations. The NC programming system may generate a file of machine control data for programming of automated machinery such as drill, drill and fasten or weld systems to perform the respective process operations.

Returning to FIG. 1, in some examples, the importation system 110 may generate a log file during importation of process operation-related data, and the log file may textually describe the respective data. The log file in some examples may be comparable to the original the engineering design data (either in context of the product design system, or via an extract to a text file) to verify accuracy of the fastener locations graphically depicted by the graphical views and imported as process operation-related data. This comparison may be performed by NC programming system 108 or another suitable system such as the product design system 102. In some examples, this type of verification may assure that none of the fastener locations have been moved, and exactly match the engineering design data.

Example implementations may keep track of which fastener locations have been processed, and which processes have been completed, as the product or part(s) of the product works through the build process. For example, automated machinery performing the respective process operations may provide input to the NC programming system 108, which may accordingly change in the second NC in-process model, the coding (e.g., size, color, shape) of those fastener locations that have been processed. In this regard, many automated machinery include controllers that may be configured to track work performed and capture locations for fastener locations or a name associated to the fastener location if inserted into the machine control data.

To further illustrate example embodiments of the present invention, reference will now be made to FIGS. 5-8, which illustrate example graphical views and NC in-process models that may be output for display by a graphic-generation system 106, 200 and NC programming system 108, 300, according to example implementations of the present disclosure. The figures illustrate graphical views and NC in-process models for one or more components of a product, in this case an aircraft structural frame, including its skin and fastener locations.

Figure 5:
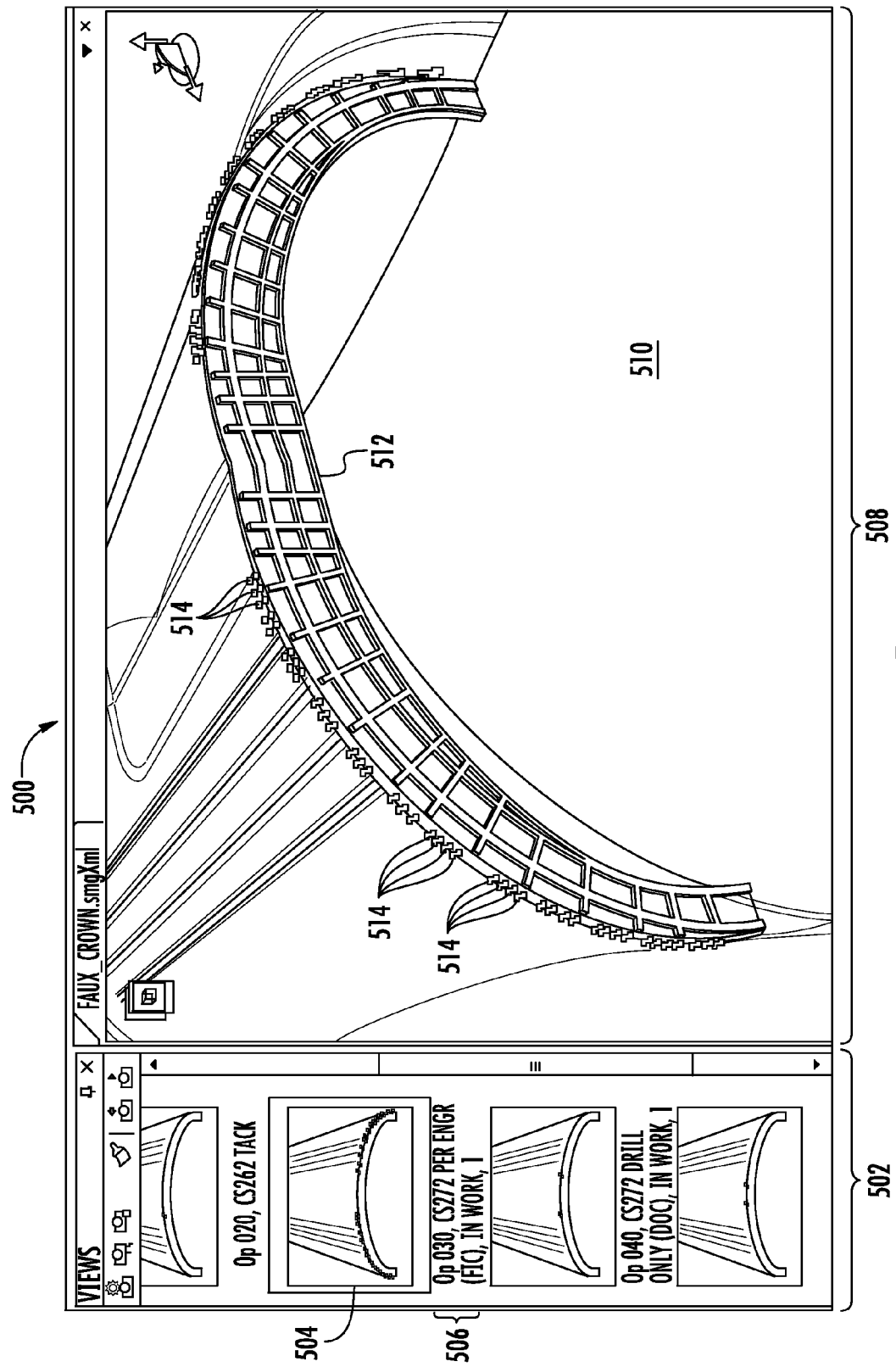

FIG. 5 illustrates graphical views for respective process operations in which fastener location(s) on component part(s) are worked for installation of respective fastener(s). As shown, the graphical views may be displayed in a graphical user interface (GUI) that includes one or more windows in a predetermined viewable area 500. The windows may include a first window 502 in which a plurality of graphical views may be presented, and which may itself have a limited viewable area, and in some examples, may be scrollable to include a greater number of graphical views than may at one time fit in the viewable area.

In the first window 502, each graphical view of a process operation may include a graphical depiction 504 of the component part(s) and fastener location(s) worked during the process operation, and include respective process operation-related data 506. The process operation-related data may include the process definition of the process operation, which may be identified by an appropriate code and text (e.g., "C5272 PER ENGR (FIC)"), and may also include a status of the process operation (e.g., "In Work 1"). The process operation-related data may also include the location on the factory floor where the process operation is to be performed, which may also be identified by an appropriate code (e.g., "Op 030").

The windows in the viewable area 500 may also include a second window 508 in which a larger representation 510 of a selected graphical view in the first window 502 (or at least its graphical depiction 504) may be presented. Although perhaps also shown in the graphical depiction in the first window, in the larger representation, the depicted component part(s) 512 and fastener location(s) 514 (only some of which are separately called out) may be more easily seen. As shown, in the graphical views and larger representation, the component part(s) may be depicted as a collection of primitives similar to the 3D model, and the fastener location(s) as points and/or vectors (e.g., centerlines). As also shown, in the graphical view and larger representation of a particular process operation, only those of the fastener locations worked during the process operation may be depicted, with any others of the fastener locations being hidden. And in some examples, the larger representation in the second window may be rotatable or otherwise movable to alter a perspective in which the component part(s) and fastener location(s) are depicted.

Figure 6:
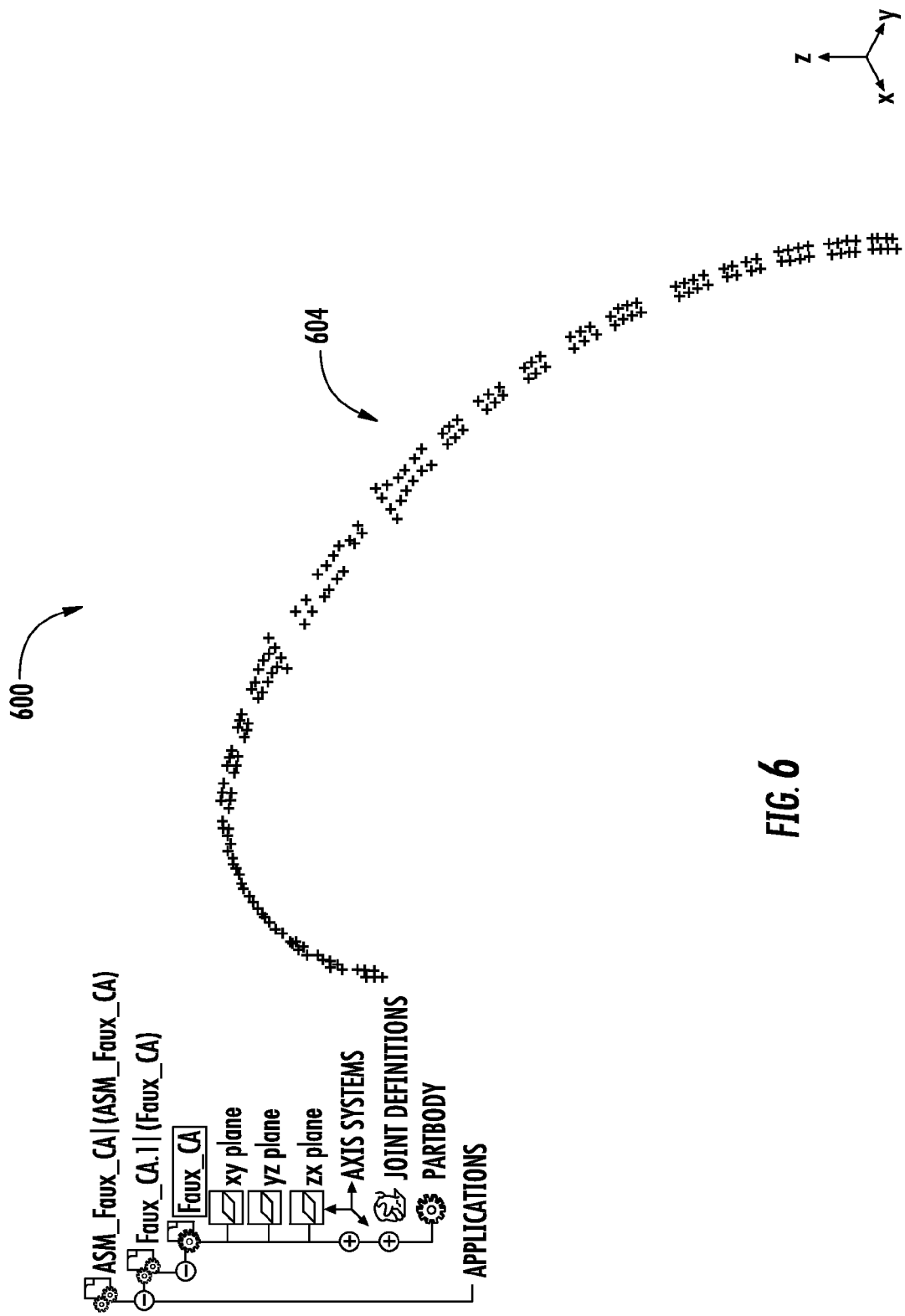

FIG. 6 illustrates a first NC in-process model of component part(s). As shown, the first NC in-process model may be displayed in a GUI that includes a predetermined viewable area 600. The GUI may include parameters 602 of the first NC in-process model, such as engineering requirements for the respective component part(s) from the engineering design data, which have been added to the first NC in-process model. The GUI may further include a graphical depiction 604 of fastener locations on the component part(s), which may be identified from fastener data (e.g., joint definitions) in the engineering design data. As shown, the fastener locations may be depicted as points and/or vectors (e.g., centerlines), as they may be represented in the engineering design data.

Figure 7:
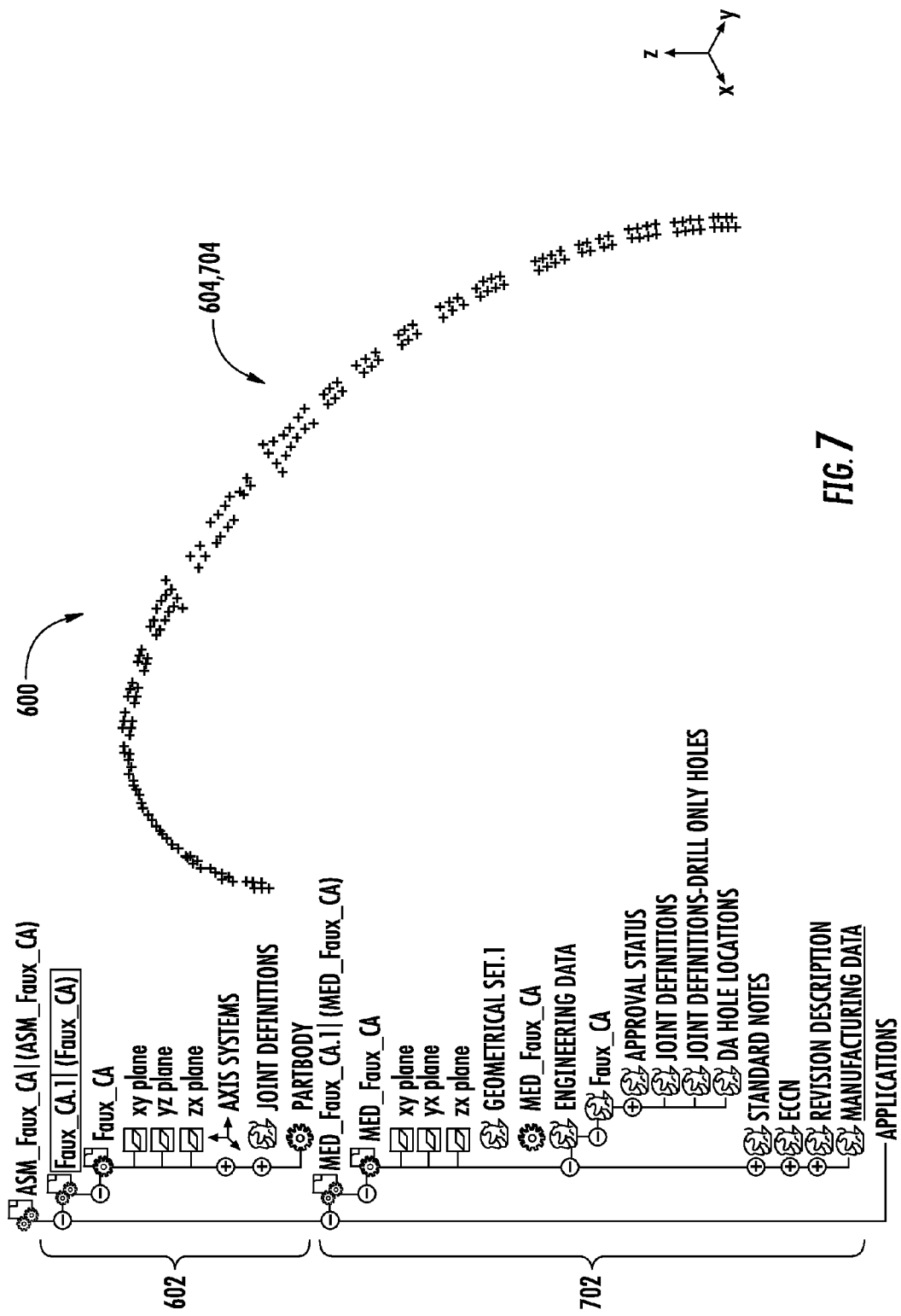

FIG. 7 illustrates an NC in-process model assembly including the first NC in-process model of FIG. 6, and another, second NC in-process model, both of which may be displayed in the viewable area 600 of the GUI. The GUI may include parameters 602 of the first NC in-process model, as before, and may additionally include parameters 702 of the second NC in-process model, such as fastener data for the fasteners with fastener locations on the respective component part(s), which have been added to the second NC in-process model. The GUI may include the graphical depiction 604 of fastener locations on the component part(s) from fastener data in the engineering design data from the first NC in-process model, and may additionally include a graphical depiction 704 of the same or substantially the same fastener locations from the fastener data from the second NC in-process model. As shown, the fastener locations from both NC in-process models may be depicted as points and/or vectors (e.g., centerlines), and may appear to overlap one another.

Figure 8A:
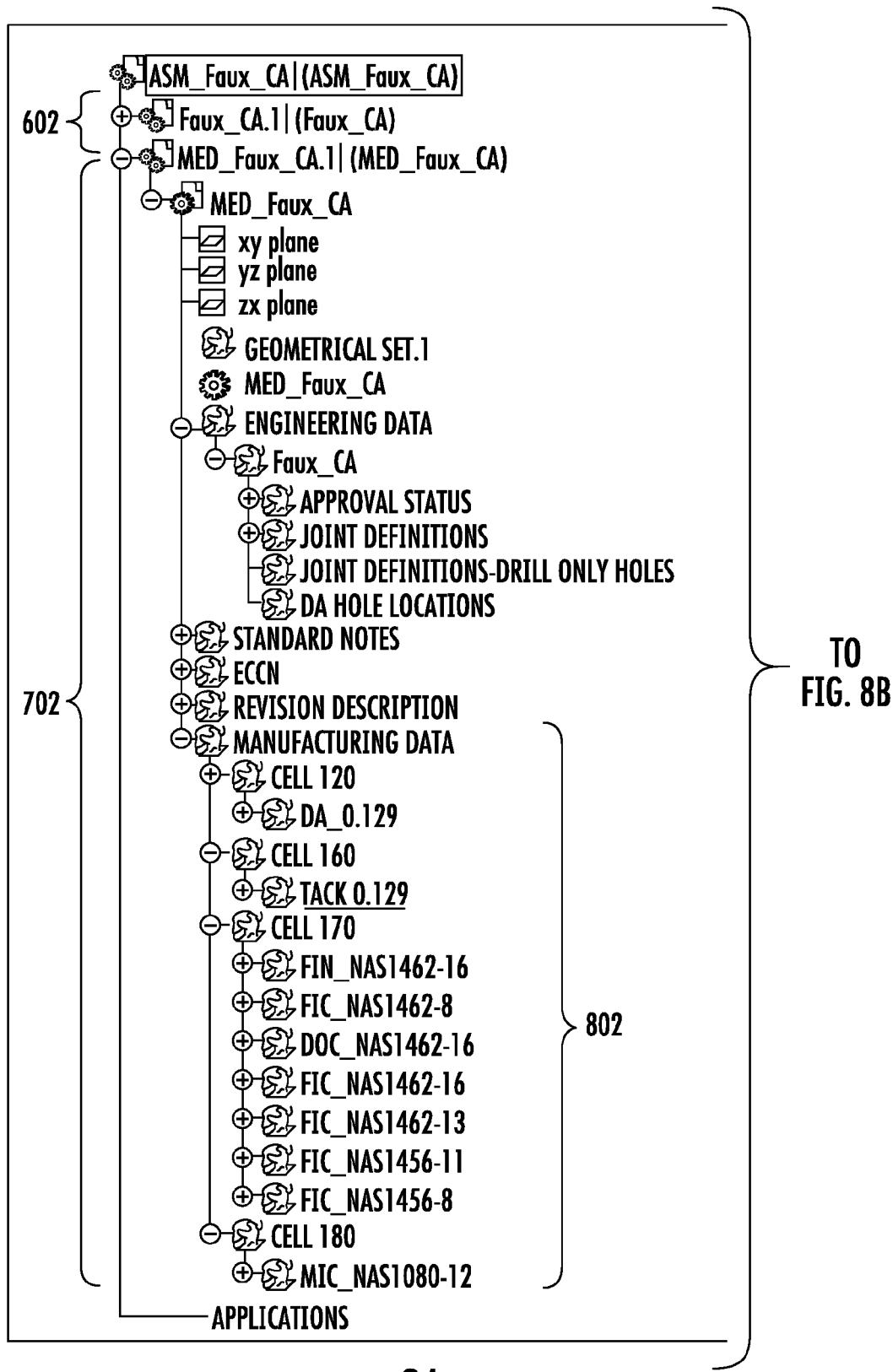
Figure 8B:
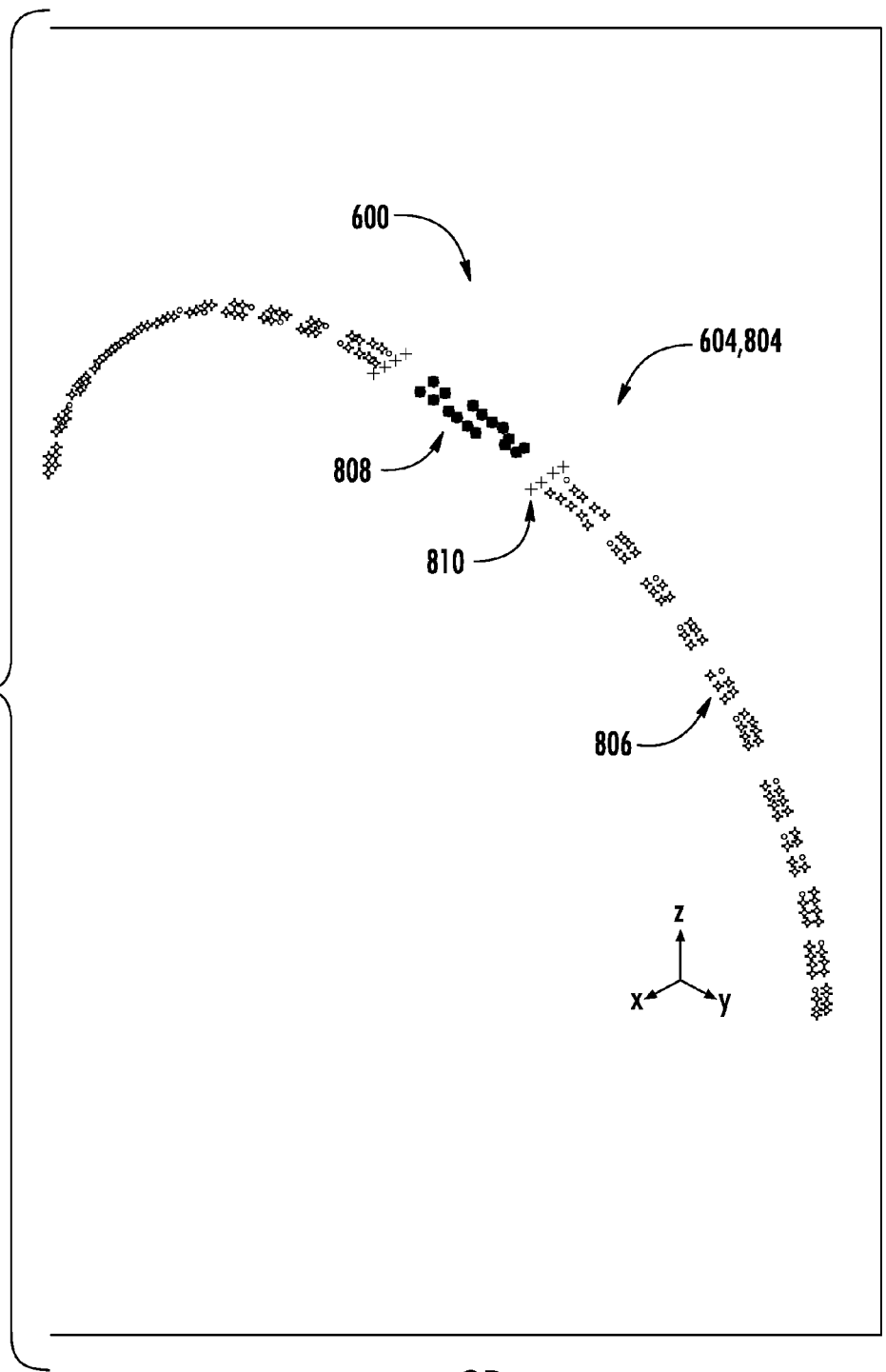

FIGS. 8A and 8B (collectively FIG. 8) illustrate a resulting NC in-process model assembly including the first and second NC in-process models of FIG. 7, after process operation-related data from graphical views such as those of FIG. 6 have been added to the second NC in-process model. As before, the GUI may include parameters 602, 702 of the first and second NC in-process models. Here, though, the parameters of the second NC in-process model may further include geometric sets 802 for fastener locations in the second NC in-process model. As explained above, the geometric set for a fastener location may include fastener data, process definition(s) and factory-floor location(s) for the fastener location to the geometric set, such as in appropriate parameters of the geometric set.

In FIG. 8, the GUI may include the graphical depiction 604 of fastener locations on the component part(s) from fastener data in the engineering design data from the first NC in-process model. The GUI may similarly include a graphical depiction 804 of the same or substantially the same fastener locations from the fastener data from the second NC in-process model. This graphical depiction 804 may be similar to graphical depiction 704 in FIG. 7, but the fastener locations in the graphical depiction may now be coded based on the process operation-related data such as by size, color, shape or the like. For example, some fastener locations 806 having the same or similar process operation-related data may be depicted as smaller circles of a first color. Other fastener locations 808 having the same or similar process operation-related data, but that different from fastener locations 806, may be depicted as smaller larger of a second color. And yet other fastener locations 810 having the same or similar process operation-related data, but that different from fastener locations 806, 808 may be depicted as centerlines of a third color.

According to example implementations of the present disclosure, the fastener manufacturing-lifecycle-management system 100 and it subsystems including the product design system 102, manufacturing process planning system 104, a graphic-generation system 106, NC programming system 108 and importation system 110 may be implemented by various means. Similarly, the examples of a graphic-generation system 200, NC programming system 300 and importation system 400, including each of their respective elements, may be implemented by various means according to example implementations. Means for implementing the systems, subsystems and their respective elements may include hardware, alone or under direction of one or more computer program code instructions, program instructions or executable computer-readable program code instructions (at times generally referred to as "computer programs," e.g., software, firmware, etc.) from a computer-readable storage medium.

In some examples, one or more apparatuses may be provided that are configured to function as or otherwise implement the systems, subsystems and respective elements shown and described herein. In examples involving more than one apparatus, the respective apparatuses may be connected to or otherwise in communication with one another in a number of different manners, such as directly or indirectly via a wired or wireless network or the like.

Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor (e.g., processor unit) connected to a memory (e.g., storage device).

The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory (of the same or another apparatus).

The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of computer hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together.

Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a computer-readable storage medium storing executable instructions that, in response to execution by the processor, cause the apparatus to implement at least:
    an input module configured to receive a manufacturing process plan for a product including a plurality of component parts joined by fasteners, the manufacturing process plan including a plurality of process definitions that describe a plurality of process operations in which component parts are worked to manufacture of the product;
    a view generator configured to generate a plurality of graphical views for respective ones of the plurality of process operations of the manufacturing process plan in which fastener locations are worked for installation of respective fasteners to join component parts of the product, the graphical view of a process operation graphically depicting one or more component parts and only those of the fastener locations on the one or more component parts worked during the process operation, any others of the fastener locations on the same or other component parts being hidden from the graphical view; and
    an output module configured to output the plurality of graphical views,
    wherein the manufacturing process plan further identifies locations on a factory floor where the plurality of process operations are to be performed, and
    wherein the graphical view of a process operation generated by the view generator further includes the process definition of the process operation and identifies the location on the factory floor where the process operation is to be performed.

2. An apparatus comprising a processor and a computer-readable storage medium storing executable instructions that, in response to execution by the processor, cause the apparatus to implement at least:
    an input module configured to receive a manufacturing process plan for a product including a plurality of component parts joined by fasteners, the manufacturing process plan including a plurality of process definitions that describe a plurality of process operations in which component parts are worked to manufacture of the product;
    a view generator configured to generate a plurality of graphical views for respective ones of the plurality of process operations of the manufacturing process plan in which fastener locations are worked for installation of respective fasteners to join component parts of the product, the graphical view of a process operation graphically depicting one or more component parts and only those of the fastener locations on the one or more component parts worked during the process operation, any others of the fastener locations on the same or other component parts being hidden from the graphical view; and
    an output module configured to output the plurality of graphical views,
    wherein the graphical view of a process operation generated by the view generator graphically depicts the one or more component parts as a collection of primitives arranged to reflect a three-dimensional geometry of the one or more component parts, and graphically depicts respective fastener locations as at least one of points or vectors without reflecting the three-dimensional geometry of fasteners installed at the respective fastener locations.

3. An apparatus comprising a processor and a computer-readable storage medium storing executable instructions that, in response to execution by the processor, cause the apparatus to implement at least:
    an input module configured to receive a manufacturing process plan for a product including a plurality of component parts joined by fasteners, the manufacturing process plan including a plurality of process definitions that describe a plurality of process operations in which component parts are worked to manufacture of the product;
    a view generator configured to generate a plurality of graphical views for respective ones of the plurality of process operations of the manufacturing process plan in which fastener locations are worked for installation of respective fasteners to join component parts of the product, the graphical view of a process operation graphically depicting one or more component parts and only those of the fastener locations on the one or more component parts worked during the process operation, any others of the fastener locations on the same or other component parts being hidden from the graphical view; and
    an output module configured to output the plurality of graphical views,
    wherein the input module, view generator and output module are elements of a graphic-generation system implemented by the apparatus, and wherein the computer-readable storage medium stores further executable instructions that, in response to execution by the processor, cause the apparatus to further implement at least:

an importation system coupled to the graphic-generation system and configured to import process operation-related data from the plurality of graphical views into a numerical control (NC) programming system, the process operation-related data including at least the plurality of process definitions and fastener locations for the respective ones of the plurality of process operations of the manufacturing process plan in which the fastener locations are worked.

4. The apparatus of claim 3, wherein the computer-readable storage medium stores further executable instructions that, in response to execution by the processor, cause the apparatus to further implement the NC programming system, including the apparatus being caused to implement at least:

an input module configured to receive engineering design data including engineering requirements for the product including the component parts, the engineering requirements including fastener data for fasteners installed to join the component parts;

an in-process model generator configured to generate an NC in-process model for one or more component parts, the NC in-process model including fastener data for fasteners with fastener locations on the respective one or more component parts;

a data merge module configured to receive process operation-related data from the importation system, and add the process operation-related data to the NC in-process model, the process operation-related data being merged with the fastener data of the NC in-process model; and an output module configured to output the NC in-process model.

5. The apparatus of claim 4, wherein the NC in-process model is a second NC in-process model, and wherein the in-process model generator being configured to generate the NC in-process model includes being configured to generate an NC in-process model assembly including a first NC in-process model and the second NC in-process model, the first NC in-process model including engineering requirements for the respective one or more component parts.

6. The apparatus of claim 3, wherein the apparatus being caused to implement the importation system includes being caused to implement at least:

an input module configured to receive the plurality of graphical views;

a parser configured to loop through the plurality of graphical views and parse each graphical view into its portion of the process operation-related data;

an organization module configured to reorganize the process operation-related data for the plurality of graphical views by fastener location, with each fastener location thereby being associated with one or more of the plurality of process definitions; and an output module configured to output the reorganized process operation-related data to the NC programming system.

7. The apparatus of claim 3, wherein the importation system is further configured to generate a log file that textually describes the process operation-related data, the log file being comparable to engineering design data including engineering requirements for the product including the component parts, the log file being comparable to the engineering design data to verify accuracy of fastener locations graphically depicted by the plurality of graphical views and imported as process operation-related data.

8. A method implemented by an apparatus comprising a processor and a computer-readable storage medium storing executable instructions executable by the processor, the method comprising:

receiving a manufacturing process plan for a product including a plurality of component parts joined by fasteners, the manufacturing process plan including a plurality of process definitions that describe a plurality of process operations in which component parts are worked to manufacture of the product;

generating a plurality of graphical views for respective ones of the plurality of process operations of the manufacturing process plan in which fastener locations are worked for installation of respective fasteners to join component parts of the product, the graphical view of a process operation graphically depicting one or more component parts and only those of the fastener locations on the one or more component parts worked during the process operation, any others of the fastener locations on the same or other component parts being hidden from the graphical view; and outputting the plurality of graphical views, wherein the manufacturing process plan further identifies locations on a factory floor where the plurality of process operations are to be performed, and wherein the graphical view of a process operation further includes the process definition of the process operation and identifies the location on the factory floor where the process operation is to be performed.

9. A method implemented by an apparatus comprising a processor and a computer-readable storage medium storing executable instructions executable by the processor, the method comprising:

receiving a manufacturing process plan for a product including a plurality of component parts joined by fasteners, the manufacturing process plan including a plurality of process definitions that describe a plurality of process operations in which component parts are worked to manufacture of the product;

generating a plurality of graphical views for respective ones of the plurality of process operations of the manufacturing process plan in which fastener locations are worked for installation of respective fasteners to join component parts of the product, the graphical view of a process operation graphically depicting one or more component parts and only those of the fastener locations on the one or more component parts worked during the process operation, any others of the fastener locations on the same or other component parts being hidden from the graphical view; and outputting the plurality of graphical views, wherein the graphical view of a process operation graphically depicts the one or more component parts as a collection of primitives arranged to reflect a three-dimensional geometry of the one or more component parts, and graphically depicts respective fastener locations as at least one of points or vectors without reflecting the three-dimensional geometry of fasteners installed at the respective fastener locations.

10. A method implemented by an apparatus comprising a processor and a computer-readable storage medium storing executable instructions executable by the processor, the method comprising:

receiving a manufacturing process plan for a product including a plurality of component parts joined by fasteners, the manufacturing process plan including a plurality of process definitions that describe a plurality of process operations in which component parts are worked to manufacture of the product;

generating a plurality of graphical views for respective ones of the plurality of process operations of the manufacturing process plan in which fastener locations are worked for installation of respective fasteners to join component parts of the product, the graphical view of a process operation graphically depicting one or more component parts and only those of the fastener locations on the one or more component parts worked during the process operation, any others of the fastener locations on the same or other component parts being hidden from the graphical view; and outputting the plurality of graphical views, wherein the method further comprises:

importing process operation-related data from the plurality of graphical views into a numerical control (NC) programming system, the process operation-related data including at least the plurality of process definitions and fastener locations for the respective ones of the plurality of process operations of the manufacturing process plan in which the fastener locations are worked.

11. The method of claim 10, wherein importing the process operation-related data comprises:

receiving the plurality of graphical views;

looping through the plurality of graphical views and parsing each graphical view into its portion of the process operation-related data;

reorganizing the process operation-related data for the plurality of graphical views by fastener location, with each fastener location thereby being associated with one or more of the plurality of process definitions; and outputting the reorganized process operation-related data to the NC programming system.

12. The method of claim 10 further comprising:

receiving engineering design data including engineering requirements for the product including the component parts, the engineering requirements including fastener data for fasteners installed to join the component parts;

generating an NC in-process model for one or more component parts, the NC in-process model including fastener data for fasteners with fastener locations on the respective one or more component parts;

receiving process operation-related data from the importation system, and adding the process operation-related data to the NC in-process model, the process operation-related data being merged with the fastener data of the NC in-process model; and outputting the NC in-process model.

13. The method of claim 12, wherein the NC in-process model is a second NC in-process model, and wherein generating the NC in-process model includes generating an NC in-process model assembly including a first NC in-process model and the second NC in-process model, the first NC in-process model including engineering requirements for the respective one or more component parts.

14. The method of claim 10 further comprising:

generating a log file that textually describes the process operation-related data, the log file being comparable to engineering design data including engineering requirements for the product including the component parts, the log file being comparable to the engineering design data to verify accuracy of fastener locations graphically depicted by the plurality of graphical views and imported as process operation-related data.

15. A computer-readable storage medium that is non-transitory and has computer-readable program code stored therein that, in response to execution by a processor, causes an apparatus to at least:

receive a manufacturing process plan for a product including a plurality of component parts joined by fasteners, the manufacturing process plan including a plurality of process definitions that describe a plurality of process operations in which component parts are worked to manufacture of the product;

generate a plurality of graphical views for respective ones of the plurality of process operations of the manufacturing process plan in which fastener locations are worked for installation of respective fasteners to join component parts of the product, the graphical view of a process operation graphically depicting one or more component parts and only those of the fastener locations on the one or more component parts worked during the process operation, any others of the fastener locations on the same or other component parts being hidden from the graphical view; and output the plurality of graphical views, wherein the manufacturing process plan further identifies locations on a factory floor where the plurality of process operations are to be performed, and wherein the graphical view of a process operation further includes the process definition of the process operation and identifies the location on the factory floor where the process operation is to be performed.

16. A computer-readable storage medium that is non-transitory and has computer-readable program code stored therein that, in response to execution by a processor, causes an apparatus to at least:

receive a manufacturing process plan for a product including a plurality of component parts joined by fasteners, the manufacturing process plan including a plurality of process definitions that describe a plurality of process operations in which component parts are worked to manufacture of the product;

generate a plurality of graphical views for respective ones of the plurality of process operations of the manufacturing process plan in which fastener locations are worked for installation of respective fasteners to join component parts of the product, the graphical view of a process operation graphically depicting one or more component parts and only those of the fastener locations on the one or more component parts worked during the process operation, any others of the fastener locations on the same or other component parts being hidden from the graphical view; and output the plurality of graphical views, wherein the graphical view of a process operation graphically depicts the one or more component parts as a collection of primitives arranged to reflect a three-dimensional geometry of the one or more component parts, and graphically depicts respective fastener locations as at least one of points or vectors without reflecting the three-dimensional geometry of fasteners installed at the respective fastener locations.

17. A computer-readable storage medium that is non-transitory and has computer-readable program code stored therein that, in response to execution by a processor, causes an apparatus to at least:

receive a manufacturing process plan for a product including a plurality of component parts joined by fasteners, the manufacturing process plan including a plurality of process definitions that describe a plurality of process operations in which component parts are worked to manufacture of the product;

generate a plurality of graphical views for respective ones of the plurality of process operations of the manufacturing process plan in which fastener locations are worked for installation of respective fasteners to join component parts of the product, the graphical view of a process operation graphically depicting one or more component parts and only those of the fastener locations on the one or more component parts worked during the process operation, any others of the fastener locations on the same or other component parts being hidden from the graphical view; and output the plurality of graphical views, wherein the computer-readable storage medium has further computer-readable program code stored therein that, in response to execution by the processor, causes the apparatus to further:

import process operation-related data from the plurality of graphical views into a numerical control (NC) programming system, the process operation-related data including at least the plurality of process definitions and fastener locations for the respective ones of the plurality of process operations of the manufacturing process plan in which the fastener locations are worked.

18. The computer-readable storage medium of claim 17 having further computer-readable program code stored therein that, in response to execution by the processor, causes the apparatus to further:

receive engineering design data including engineering requirements for the product including the component parts, the engineering requirements including fastener data for fasteners installed to join the component parts;

generate an NC in-process model for one or more component parts, the NC in-process model including fastener data for fasteners with fastener locations on the respective one or more component parts;

receive process operation-related data from the importation system, and add the process operation-related data to the NC in-process model, the process operation-related data being merged with the fastener data of the NC in-process model; and output the NC in-process model.

19. The computer-readable storage medium of claim 18, wherein the NC in-process model is a second NC in-process model, and wherein the apparatus being caused to generate the NC in-process model includes being caused to generate an NC in-process model assembly including a first NC in-process model and the second NC in-process model, the first NC in-process model including engineering requirements for the respective one or more component parts.

20. The computer-readable storage medium of claim 17, wherein the apparatus being caused to import the process operation-related data includes being caused to:

receive the plurality of graphical views;

loop through the plurality of graphical views and parse each graphical view into its portion of the process operation-related data;

reorganize the process operation-related data for the plurality of graphical views by fastener location, with each fastener location thereby being associated with one or more of the plurality of process definitions; and output the reorganized process operation-related data to the NC programming system.

21. The computer-readable storage medium of claim 17 having further computer-readable program code stored therein that, in response to execution by the processor, causes the apparatus to further:

generate a log file that textually describes the process operation-related data, the log file being comparable to engineering design data including engineering requirements for the product including the component parts, the log file being comparable to the engineering design data to verify accuracy of fastener locations graphically depicted by the plurality of graphical views and imported as process operation-related data.

* * * * *